Aug. 25, 1936.  W. E. SYKES  2,051,915
GEAR
Filed June 28, 1934

INVENTOR
William E. Sykes
BY
Fraser, Myers & Manley
ATTORNEYS

Patented Aug. 25, 1936

2,051,915

UNITED STATES PATENT OFFICE 2,051,915

GEAR

William E. Sykes, Buffalo, N. Y.

Application June 28, 1934, Serial No. 732,850

2 Claims. (Cl. 74—460)

This invention relates to an improved construction of gears, being especially adapted to those of the herringbone type.

It has heretofore been proposed to harden the wearing surfaces of gear teeth by the tempering method with the objective of lengthening the life of the teeth by hardening their side faces. To effect this it has been proposed to heat the individual teeth throughout their length by the use of an oxy-acetylene flame or other blow-torch, after which the heated teeth are immediately quenched in water or with water or other suitable tempering liquid.

Such gears have, however, not been entirely successful, particularly in the case of herringbone gears, for the reason that at the apices of the teeth the tooth metal shows a tendency to crack, chip or flake off. The same tendency is also observed at the sides of the teeth at their ends where considerable disintegration is found to take place. The precise reason for such disintegration is not always apparent, but it may be due to the apices and the ends of the teeth being subjected to a higher temperature during the application of the heating flame, or possibly due to quicker cooling because of the more rapid dissipation of heat at these points due to their more extended conduction surfaces.

The object of the present invention is to avoid these disadvantages and to provide gears, particularly of helical and herringbone types, with teeth wherein a longer life of a hardened tooth will be attained, while at the same time the ends and apices will not be subject to chipping or disintegration. To effect these results I form a gear with what may be termed a composite tooth, in which a certain section of the tooth is hardened for wear and another section is of tough or unhardened and unbrittle metal. In the case of herringbone gears the apices and preferably the ends are of tough or unhardened metal, and between the apices and ends are located substantial sections of hardened metal. Preferably in carrying out the invention the gear is constructed of a metal which has the requisite degree of toughness for the unhardened sections, and the hardened sections are tempered by heat and quenching.

In the drawing I have shown the invention as applied to a herringbone gear, wherein, Figure 1 is an end view of a typical gear of this type.

Figure 1:
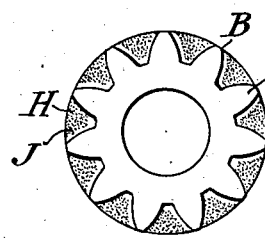

Referring to the drawing, let A indicate the gear as a whole which is shown as a typical small gear or pinion of the herringbone type, wherein the teeth B are shown as having considerable angularity. In herringbone gears, as is well known, a single tooth is composed of a right-hand and a left-hand section which meet at the center of the periphery of the gear in an apex C. It is very desirable, if not essential, that the apices on their interior sides shall be maintained free from chips or the like, and it is also very desirable to avoid the breaking down of teeth so that the latter shall not be permitted to start to disintegrate at any portion of its length. Perhaps the most dangerous point is the interior of the apices where chips or the like will to a certain extent be pocketed.

Figure 2:
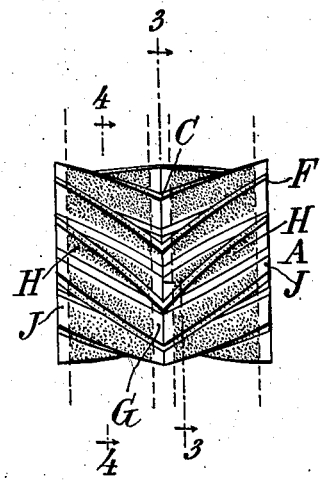
Fig. 2 is a face view.
Figure 3:
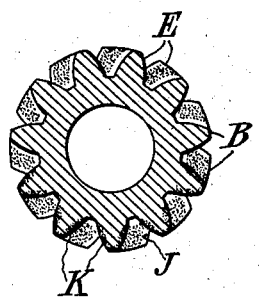
Fig. 3 is a section on the line 3—3 in Fig. 2.

In prior structures wherein the teeth are provided with surface hardening, this hardening extends over substantially the entire side surfaces of the teeth, indicated at E in Fig. 3. This has permitted, and indeed provoked, chipping, cracking and other disintegration. The same is true at the extreme ends of the teeth shown at F in Figs. 1 and 2.

According to the present invention I construct the gear with what might be called compound teeth; that is to say, with hard wearing sections and relatively soft unhardened tough protecting sections. In the construction which I prefer to employ in herringbone teeth, I provide a central zone of unhardened or tough metal which coincides with the apices of all the teeth. This zone is indicated in Fig. 2 at G. Towards the ends of the teeth I provide a zone, preferably considerably wider than the first, of hardened surface, indicated at H. At the extreme ends and extending a substantial distance inwardly as shown at J, I provide other zones of tough and unhardened material. Thus in a herringbone gear there will be two zones of hardened surface flanked on the outside with two zones of unhardened or tough surface, and divided medially at the apices with a third zone of unhardened or tough surface.

Figure 4:
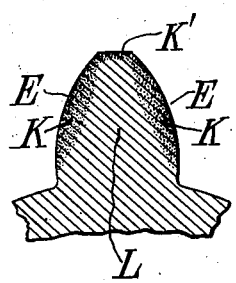
Fig. 4 is an enlarged section of a tooth taken on the line 4—4 in Fig. 2.

In Fig. 4 I have illustrated a section of a tooth taken through the hardened zone. In this figure the sides E, E of the tooth are hardened, as shown at K, K, wherein the hardened portions are indicated by dotted hatching, and the unhardened portion L is indicated by plain hatching. This figure is diagrammatic only since the thickness of the hardened area may vary in depth, the depth depending upon the particular kind of use to which the gear is to be put. The varying thicknesses are intended to be covered by the term "surface". The top of the tooth may also be provided with a hardened surface, as shown at K', although with a properly formed gear having properly set up teeth the wear at the extreme top of each tooth is negligible.

In gears of other construction than the herringbone, the middle tough zone may of course be omitted and the sides alone be unhardened.

In producing a gear according to the present invention one conveniently starts with a grade of steel or other suitable metal of a requisite toughness. An oxy-acetylene blow-torch of known type is used, the flame of which is surrounded or nearly surrounded by a spray of water. This type of torch is in wide use and well known. The flame from this torch is applied to those sections of the composite tooth which are desired to be hardened. It is guided along this surface to be hardened by hand or by suitable mechanical means. By the use of this type of torch the tooth may be selectively hardened to provide the composite form already described. By its use a quick and intense heat together with rapid quenching is obtained. Other methods may be employed if desired but satisfactory results are obtained by that just described.

The gear provided by my invention has much superior wearing qualities to any gear heretofore proposed. The hardened sections wear away very slowly under the frictional loads imposed upon them in use, while the unhardened or tough sections protect the hardened sections at those points where in a completely hardened tooth there is most danger of chipping, flaking or other form of disintegration.

The invention does not prohibit some hardening of the tough zones, and in the claims I have used the term "tough" to indicate both the original metal and also metal which may have been subjected to some hardening process but which still has sufficient toughness to secure the results of the invention.

While I have shown and described one form of the invention, it will be understood that I do not wish to be limited thereto as various changes may be made therein without departing from the spirit of the invention.

What I claim is:

1. A gear having a body portion or hub and a series of integral teeth helically arranged around the periphery of the body portion, each tooth having portions of opposite hand to constitute a herringbone arrangement, and each of the teeth having hardened side surfaces substantially throughout their area except at the zone of the apices of the teeth whereat the surfaces remain unhardened.

2. A gear having a body portion or hub and a series of integral teeth helically arranged around the periphery of the body portion, each tooth having portions of opposite hand to constitute a herringbone arrangement, and each of the teeth having hardened side surfaces substantially throughout their area except at the zones of the apices and the ends of the teeth whereat the surfaces remain unhardened.

WILLIAM E. SYKES.